United States Patent
Kato

(10) Patent No.: US 10,269,498 B2
(45) Date of Patent: Apr. 23, 2019

(54) MULTI-LAYER CERAMIC CAPACITOR AND METHOD OF PRODUCING THE SAME

(71) Applicant: Taiyo Yuden Co., Ltd., Tokyo (JP)

(72) Inventor: Yoichi Kato, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 15/833,493

(22) Filed: Dec. 6, 2017

(65) Prior Publication Data
US 2018/0166217 A1 Jun. 14, 2018

(30) Foreign Application Priority Data
Dec. 13, 2016 (JP) ................................. 2016-241268

(51) Int. Cl.
| | |
|---|---|
| H01G 4/30 | (2006.01) |
| H01G 4/012 | (2006.01) |
| H01G 4/12 | (2006.01) |
| H01G 4/232 | (2006.01) |

(52) U.S. Cl.
CPC .............. *H01G 4/30* (2013.01); *H01G 4/012* (2013.01); *H01G 4/12* (2013.01); *H01G 4/232* (2013.01); *H01G 4/2325* (2013.01); *H01G 4/308* (2013.01); *H01G 4/1227* (2013.01)

(58) Field of Classification Search
CPC .......... H01G 4/30; H01G 4/228; H01G 4/232; H01G 4/005; H01G 4/012
See application file for complete search history.

(56) References Cited

U.S. PATENT DOCUMENTS

| | | | | |
|---|---|---|---|---|
| 4,750,084 A | * | 6/1988 | Nikaidoh | H01G 4/30 29/25.42 |
| 7,298,603 B2 | * | 11/2007 | Mizuno | H01G 4/005 29/25.42 |
| 2005/0264975 A1 | * | 12/2005 | Yamazaki | H01C 1/02 361/301.1 |
| 2012/0229949 A1 | | 9/2012 | Kim | |
| 2015/0027764 A1 | * | 1/2015 | Lee | H01G 4/30 174/260 |

FOREIGN PATENT DOCUMENTS

| | | | |
|---|---|---|---|
| JP | 2001155959 A | * | 6/2001 |
| JP | 2003264119 A | * | 9/2003 |
| JP | 2012-191159 A | | 10/2012 |

\* cited by examiner

*Primary Examiner* — Eric W Thomas
(74) *Attorney, Agent, or Firm* — Saliwanchik, Llyod & Eisenschenk

(57) ABSTRACT

A multi-layer ceramic capacitor includes a body. The body includes a capacitance forming unit, a cover, and a side margin. The capacitance forming unit includes ceramic layers laminated in a first direction and internal electrodes disposed between the ceramic layers. The cover covers the capacitance forming unit from the first direction. The side margin covers the capacitance forming unit from a second direction orthogonal to the first direction. The capacitance forming unit includes a surface layer portion adjacent to the cover. Ends of the internal electrodes in the second direction in the surface layer portion are curved toward the cover.

2 Claims, 14 Drawing Sheets

MULTI-LAYER CERAMIC CAPACITOR AND METHOD OF PRODUCING THE SAME

CROSS-REFERENCE TO RELATED APPLICATION

This application claims the benefit of Japanese Priority Patent Application No. 2016-241268, filed Dec. 13, 2016, the disclosure of which is herein incorporated by reference in its entirety.

BACKGROUND

The present invention relates to a multi-layer ceramic capacitor and a method of producing the multi-layer ceramic capacitor.

In recent years, multi-layer ceramic capacitors have been widely used as, for example, electronic components mounted to electronic devices such as smartphones and mobile phones.

For example, Japanese Patent Application Laid-open No. 2012-191159 describes a multi-layer ceramic capacitor including: a capacitance forming unit that includes ceramic layers and internal electrodes disposed between the ceramic layers; a cover that covers the capacitance forming unit from a lamination direction in which the ceramic layers are laminated; and a side margin that covers the capacitance forming unit from a direction orthogonal to the lamination direction.

SUMMARY

In the multi-layer ceramic capacitor, electrical conduction between the internal electrodes may occur due to various factors, a short circuit failure may occur, and thus a function as a capacitor may be impaired. The inventor of the present application found out that such a short circuit failure is prone to occur in the vicinity of the corners of the capacitance forming unit, at which the cover and the side margin meet.

In view of the circumstances as described above, it is desirable to provide a multi-layer ceramic capacitor and a method of producing the multi-layer ceramic capacitor, which suppress the occurrence of a short circuit failure in the vicinity of the corners of a capacitance forming unit.

According to an embodiment of the present invention, there is provided a multi-layer ceramic capacitor including a body.

The body includes a capacitance forming unit that includes ceramic layers laminated in a first direction and internal electrodes disposed between the ceramic layers, a cover that covers the capacitance forming unit from the first direction, and a side margin that covers the capacitance forming unit from a second direction orthogonal to the first direction.

The capacitance forming unit includes a surface layer portion adjacent to the cover. Ends of the internal electrodes in the second direction in the surface layer portion are curved toward the cover.

According to this configuration, in the vicinity of the corners of the capacitance forming unit, at which a short circuit failure is prone to occur, intervals between the ends of the internal electrodes are favorably ensured. Therefore, electrical conduction between the internal electrodes in the vicinity of the corners of the capacitance forming unit is effectively suppressed, and the occurrence of a short circuit failure of the multi-layer ceramic capacitor is suppressed.

The body may have a main surface oriented in the first direction. In the internal electrode adjacent to the cover, a distance in the first direction between the main surface and the end of the internal electrode may be shorter than a distance in the first direction between the main surface and the center portion of the internal electrode in the second direction.

With this configuration, the ends of the internal electrodes adjacent to the cover are configured to be curved toward the cover. Therefore, intervals between the ends of the internal electrodes are favorably ensured.

A dimension of a portion of the surface layer portion in the first direction may be 5 µm or more, the ends of the internal electrodes being disposed in the portion.

With this configuration, the ends of the internal electrodes, which can favorably ensure the intervals between the internal electrodes, are provided in a wide range in the vicinity of the corners of the capacitance forming unit. Therefore, the occurrence of a short circuit failure in the vicinity of the corners of the capacitance forming unit can be reliably suppressed.

According to an embodiment of the present invention, there is provided a method of producing a multi-layer ceramic capacitor, the method including: producing an unsintered multi-layer chip including a capacitance forming unit that includes ceramic layers laminated in a first direction and internal electrodes disposed between the ceramic layers, and a cover that covers the capacitance forming unit from the first direction; forming a surface layer portion in the capacitance forming unit, the surface layer portion being adjacent to the cover, ends of the internal electrodes in a second direction in the surface layer portion being curved toward the cover, the second direction being orthogonal to the first direction; and covering the multi-layer chip with a side margin made of insulating ceramics from the second direction.

According to the method described above, in the vicinity of the corners of the capacitance forming unit, at which a short circuit failure is prone to occur, intervals between the ends of the internal electrodes are favorably ensured. With this configuration, even when the ends of the internal electrodes in the vicinity of the corners of the capacitance forming unit are deformed due to, for example, differences in shrinkage behavior at the time of sintering between the side margin, the capacitance forming unit, and the cover, contact of the ends of the internal electrodes is suppressed.

The multi-layer chip may punch out a side margin sheet mainly made of insulating ceramics, to form the surface layer portion in the capacitance forming unit.

Before the multi-layer chip is covered with the side margin, the multi-layer chip may be pressed from the second direction, to form the surface layer portion in the capacitance forming unit.

It is possible to provide a multi-layer ceramic capacitor and a method of producing the multi-layer ceramic capacitor, which suppress the occurrence of a short circuit failure in the vicinity of the corners of a capacitance forming unit.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, embodiments of the present invention will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-layer Ceramic Capacitor 10

Figure 1:
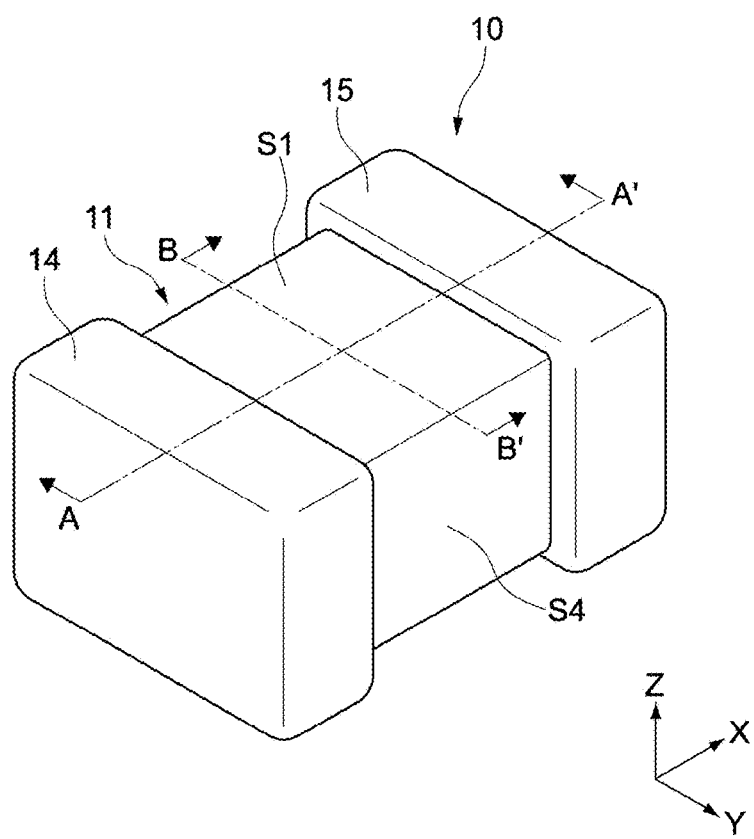
FIG. 1 is a perspective view of a multi-layer ceramic capacitor according to one embodiment of the present invention.
Figure 2:
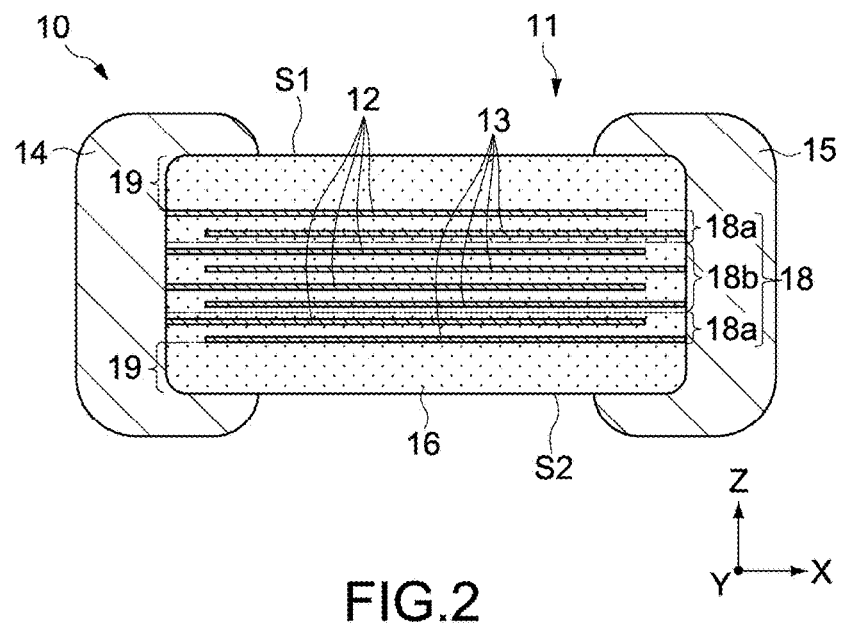
FIG. 2 is a cross-sectional view of the multi-layer ceramic capacitor taken along the A-A' line in FIG. 1.
Figure 3:
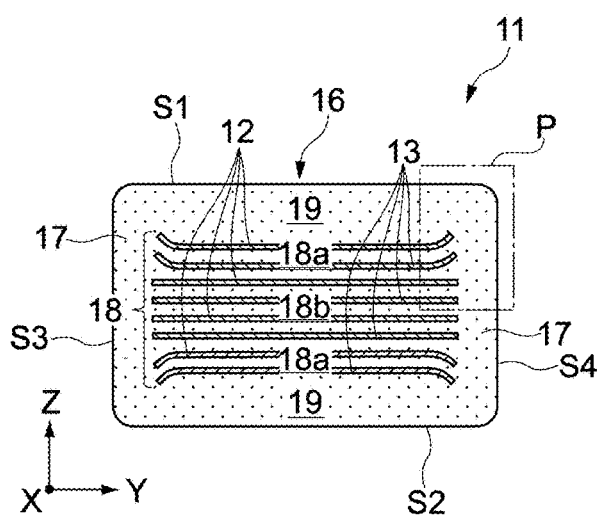
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15.

Typically, the body 11 has two main surfaces S1 and S2 oriented in a Z-axis direction and two side surfaces S3 and S4 oriented in a Y-axis direction. Ridges connecting the respective surfaces of the body 11 are chamfered. It should be noted that the form of the body 11 is not limited to the form as described above. For example, the surfaces of the body 11 may be curved surfaces, and the body 11 may be rounded as a whole.

The first external electrode 14 and the second external electrode 15 cover both end surfaces of the body 11 that are oriented in an X-axis direction, and extend to four surfaces that are connected to both the end surfaces oriented in the X-axis direction. With this configuration, both of the first external electrode 14 and the second external electrode 15 have U-shaped cross sections in parallel with an X-Z plane and an X-Y plane.

The body 11 includes a multi-layer unit 16 and side margins 17.

The multi-layer unit 16 has a configuration in which a plurality of ceramic layers are laminated in the Z-axis direction.

The multi-layer unit 16 includes a capacitance forming unit 18 and covers 19.

The capacitance forming unit 18 includes a plurality of first internal electrodes 12 and a plurality of second internal electrodes 13. The first internal electrodes 12 and the second internal electrodes 13 are alternately disposed between the ceramic layers along the Z-axis direction. The first internal electrodes 12 are connected to the first external electrode 14 and are insulated from the second external electrode 15. The second internal electrodes 13 are connected to the second external electrode 15 and are insulated from the first external electrode 14.

The first internal electrodes 12 and the second internal electrodes 13 are each made of an electrical conductive material and function as internal electrodes of the multi-layer ceramic capacitor 10. Examples of the electrical conductive material include a metal material containing nickel (Ni), copper (Cu), palladium (Pd), platinum (Pt), silver (Ag), gold (Au), or an alloy of them. Typically, a metal material mainly containing nickel (Ni) is employed.

As shown in FIGS. 2 and 3, the capacitance forming unit 18 includes surface layer portions 18a adjacent to the respective covers 19 and a center portion 18b adjacent to the surface layer portions 18a in the Z-axis direction. In other words, the surface layer portions 18a form both ends of the capacitance forming unit 18 in the Z-axis direction, and the center portion 18b forms the center portion of the capacitance forming unit 18 in the Z-axis direction.

As shown in FIG. 3, the surface layer portions 18a are covered with the covers 19 from the Z-axis direction and with the side margins 17 from the Y-axis direction. As shown in FIG. 3, the center portion 18b is covered with the surface layer portions 18a in the Z-axis direction and with the side margins 17 in the Y-axis direction.

Here, in the multi-layer ceramic capacitor 10 according to this embodiment, as shown in FIG. 3, the ends of the first and second internal electrodes 12 and 13 in the Y-axis direction in the surface layer portions 18a are curved in a direction away from the center portion 18b.

In other words, in the vicinity of the corners of the capacitance forming unit 18, at which the covers 19 and the side margins 17 meet, the ends of the first and second internal electrodes 12 and 13 in the Y-axis direction are curved in a direction away from the center portion 18b. With this configuration, intervals between the ends of the first and second internal electrodes 12 and 13 in the Y-axis direction are favorably ensured in the vicinity of the corners of the capacitance forming unit 18, and the occurrence of a short circuit failure in the vicinity of the corners is suppressed. The ends of the first and second internal electrodes 12 and 13 will be described later.

The capacitance forming unit 18 is made of ceramics. In the capacitance forming unit 18, in order to increase capacitances of the ceramic layers provided between the first internal electrodes 12 and the second internal electrodes 13, a material having a high dielectric constant is used as a material forming the ceramic layers. For the capacitance forming unit 18, polycrystal of a barium titanate ($BaTiO_3$)

based material, i.e., polycrystal having a Perovskite structure containing barium (Ba) and titanium (Ti) can be used, for example.

Alternatively, the capacitance forming unit 18 may be made of polycrystal of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The covers 19 respectively cover the upper and lower surfaces of the capacitance forming unit 18 in the Z-axis direction. The covers 19 are not provided with the first internal electrodes 12 and the second internal electrodes 13.

As shown in FIG. 3, the side margins 17 are formed integrally with the covers 19 and cover the capacitance forming unit 18 from the Y-axis direction.

In such a manner, in the body 11, except for both the end surfaces, which are oriented in the X-axis direction and to which the first external electrode 14 and the second external electrode 15 are provided, surfaces of the capacitance forming unit 18 are covered with the side margins 17 and the covers 19. The side margins 17 and the covers 19 have main functions of protecting the periphery of the capacitance forming unit 18 and ensuring insulation properties of the first internal electrodes 12 and the second internal electrodes 13.

The side margins 17 and the covers 19 are also made of ceramics. A material forming the side margins 17 and the covers 19 is insulating ceramics. Use of ceramics having a composition system common to that of the capacitance forming unit 18 leads to suppression of internal stress in the body 11.

The side margins 17, the covers 19, and the capacitance forming unit 18 may further contain, for example, one or more types of metal elements such as magnesium (Mg), manganese (Mn), aluminum (Al), calcium (Ca), vanadium (V), chromium (Cr), zirconium (Zr), molybdenum (Mo), tungsten (W), tantalum (Ta), niobium (Nb), silicon (Si), boron (B), yttrium (Y), europium (Eu), gadolinium (Gd), dysprosium (Dy), holmium (Ho), erbium (Er), ytterbium (Yb), lithium (Li), potassium (K), and sodium (Na), other than barium (Ba) and titanium (Ti).

With the configuration described above, when a voltage is applied between the first external electrode 14 and the second external electrode 15 in the multi-layer ceramic capacitor 10, the voltage is applied to the ceramic layers between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the multi-layer ceramic capacitor 10 according to this embodiment only needs to include the multi-layer unit 16 and the side margins 17, and other configurations can be changed as appropriate. For example, the number of first internal electrodes 12 and second internal electrodes 13 can be determined as appropriate according to the size and performance expected for the multi-layer ceramic capacitor 10.

Further, in FIGS. 2 and 3, in order to make the facing state of the first and second internal electrodes 12 and 13 easily viewable, the number of first internal electrodes 12 and the number of second internal electrodes 13 are each set to four. However, actually, more first and second internal electrodes 12 and 13 are provided so as to ensure the capacitance of the multi-layer ceramic capacitor 10.

Figure 4:
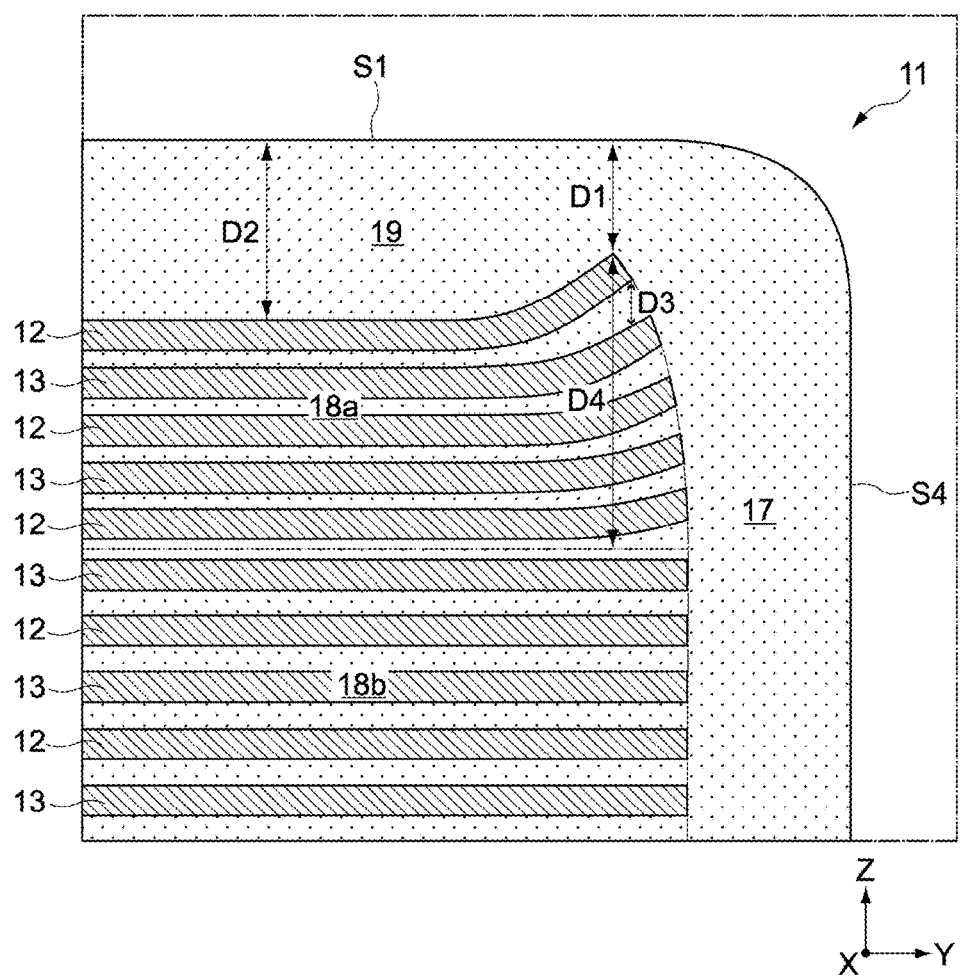
FIG. 4 is an enlarged schematic view of an area P of the multi-layer ceramic capacitor shown in FIG. 3.

FIG. 4 is an enlarged schematic view of an area P shown in FIG. 3. As shown in FIG. 4, the ends of the first and second internal electrodes 12 and 13 in the Y-axis direction, which are disposed in the surface layer portion 18a, are curved toward the cover 19 on the main surface 51 side. The ends of the first and second internal electrodes 12 and 13 in the Y-axis direction are adjacent to the side margin 17.

It should be noted that, in the multi-layer ceramic capacitor 10, the ends of the first and second internal electrodes 12 and 13 in the Y-axis direction, which are disposed in the surface layer portion 18a on the main surface S2 side, also have a similar configuration to that shown in FIG. 4. The main surface S2 side is the opposite side of the main surface Si in the Z-axis direction.

At the surface layer portion 18a, an interval between the end of the first internal electrode 12 in the Y-axis direction and the end of the second internal electrode 13 in the Y-axis direction gradually increases toward the side margin 17 as shown in FIG. 4. This interval is larger than a distance between the first internal electrode 12 and the second internal electrode 13 in the vicinity of the center portion of the surface layer portion 18a in the Y-axis direction.

In particular, in the first internal electrode 12 adjacent to the cover 19, a distance in the Z-axis direction between the end of the first internal electrode 12 in the Y-axis direction and the main surface S1 is shorter than a distance in the Z-axis direction between the center portion of the first internal electrode 12 in the Y-axis direction and the main surface S1. In other words, a distance D1 between the end of the first internal electrode 12 in the Y-axis direction and the main surface S1 is shorter than a distance D2 between the center portion of the first internal electrode 12 in the Y-axis direction and the main surface S1, the first internal electrode 12 being adjacent to the cover 19.

With this configuration, an interval D3 between the end of the first internal electrode 12 in the Y-axis direction, the first internal electrode 12 being adjacent to the cover 19, and the end of the second internal electrode 13 in the Y-axis direction, the end facing the end of the first internal electrode 12 in the Z-axis direction via the ceramic layer, is larger than an average distance between the first internal electrodes 12 and the second internal electrodes 13 in the vicinity of the center portion of the surface layer portion 18a in the Y-axis direction.

Therefore, the interval between the end of the first internal electrode 12 in the Y-axis direction, the first internal electrode 12 being adjacent to the cover 19, and the end of the second internal electrode 13 in the Y-axis direction is favorably ensured.

Further, a dimension D4 of a portion of the surface layer portion 18a in the Z-axis direction, in which the ends of the first internal electrodes 12 and the second internal electrodes 13 are curved toward the cover 19, is desirably larger than 5 µm. Specifically, the dimension D4 is a distance between the end of the first internal electrode 12 in the Y-axis direction, the first internal electrode 12 being adjacent to the cover 19, and the center portion 18b.

With this configuration, the ends of the first internal electrodes 12 and the second internal electrodes 13 in the Y-axis direction, which can favorably ensure the intervals between the first internal electrodes 12 and the second internal electrodes 13, are provided in a wide range in the vicinity of the corners of the capacitance forming unit 18.

Therefore, the occurrence of a short circuit failure in the vicinity of the corners of the capacitance forming unit 18 can be reliably suppressed.

As shown in FIG. 4, the first internal electrodes 12 and the second internal electrodes 13 of the center portion 18b extend in the Y-axis direction toward the side margin 17 and ensure constant intervals therebetween.

In this embodiment, in the surface layer portions 18a, the ends of the first and second internal electrodes 12 and 13 in the Y-axis direction are configured as described above. Thus, in the vicinity of the corners of the capacitance forming unit 18, the intervals between the ends of the first and second internal electrodes 12 and 13 in the Y-axis direction are favorably ensured. With this configuration, electrical conduction between the first internal electrodes 12 and the second internal electrodes 13 is effectively suppressed in the vicinity of the corners of the capacitance forming unit 18, and the occurrence of a short circuit failure of the multi-layer ceramic capacitor 10 is suppressed.

2. Method of Producing Multi-layer Ceramic Capacitor 10

Figure 5:
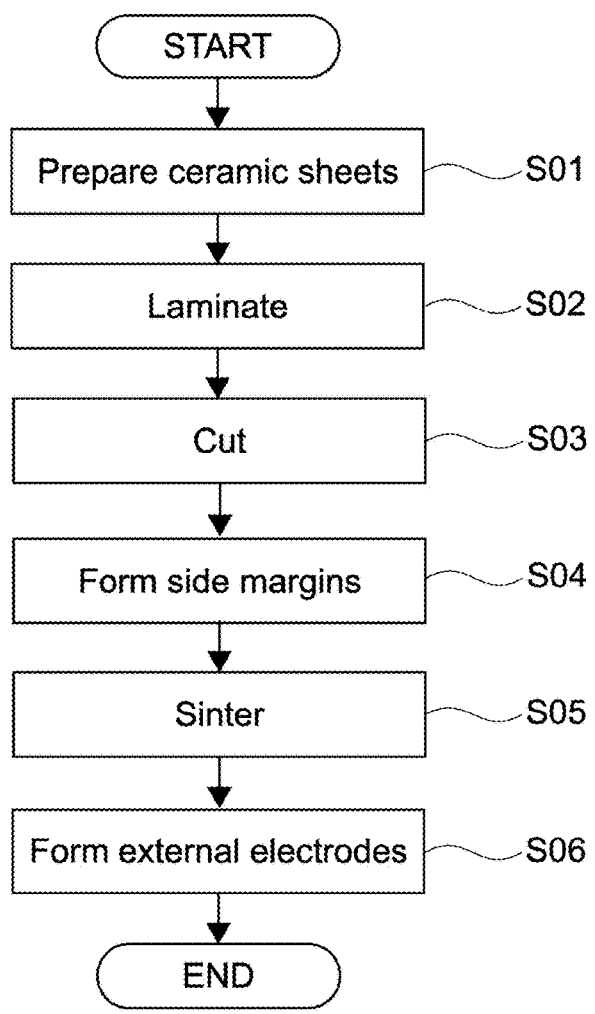
FIG. 5 is a flowchart showing a method of producing the multi-layer ceramic capacitor.
Figure 6:
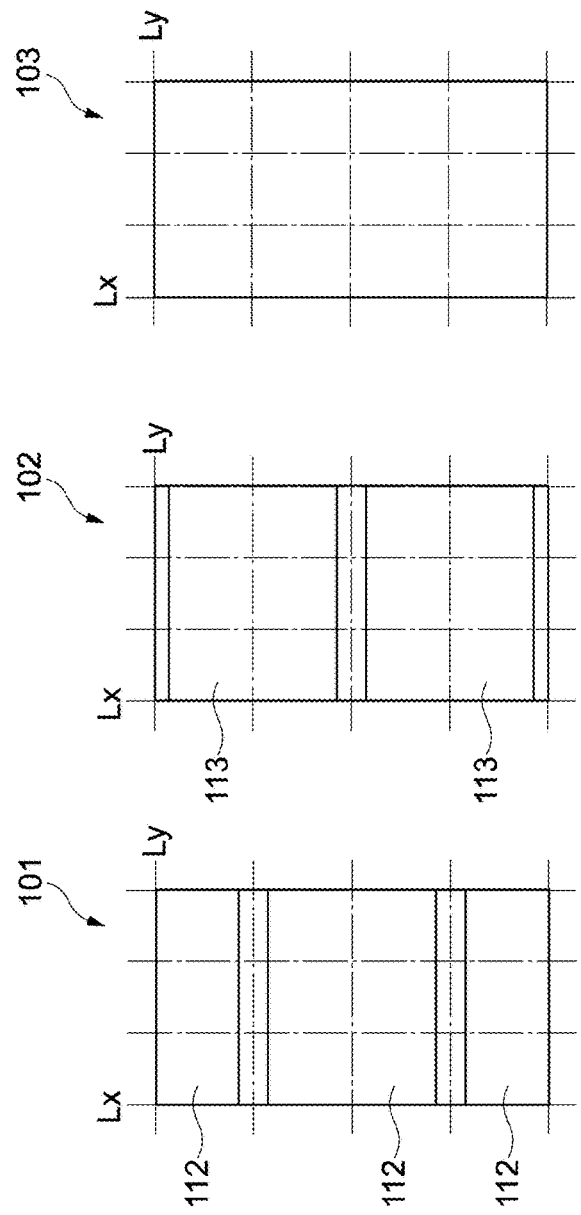
FIG. 6A is a plan view showing a production process of the multi-layer ceramic capacitor.
FIG. 6B is a plan view showing a production process of the multi-layer ceramic capacitor.
FIG. 6C is a plan view showing a production process of the multi-layer ceramic capacitor.

FIG. 5 is a flowchart showing a method of producing the multi-layer ceramic capacitor 10. FIGS. 6A to 13 are views each showing a production process of the multi-layer ceramic capacitor 10. Hereinafter, the method of producing the multi-layer ceramic capacitor 10 will be described along FIG. 5 with reference to FIGS. 6A to 13 as appropriate.

2.1 Step S01: Preparation of Ceramic Sheets

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are mainly made of insulating ceramics and are configured as unsintered dielectric green sheets. The first, second, and third ceramic sheets 101, 102, and 103 are formed into sheets by using a roll coater or a doctor blade, for example.

FIGS. 6A, 6B, and 6C are plan views of the first, second, and third ceramic sheets 101, 102, and 103, respectively. At this stage, the first, second, and third ceramic sheets 101, 102, and 103 are not yet cut into the multi-layer ceramic capacitors 10. FIGS. 6A, 6B, and 6C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first and second internal electrodes 112 and 113 can be formed using an electrical conductive paste containing nickel (Ni), for example. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

2.2 Step S02: Lamination

In Step S02, the first, second, and third ceramic sheets 101, 102, and 103 prepared in Step S01 are laminated, to produce a multi-layer sheet 104.

Figure 7:
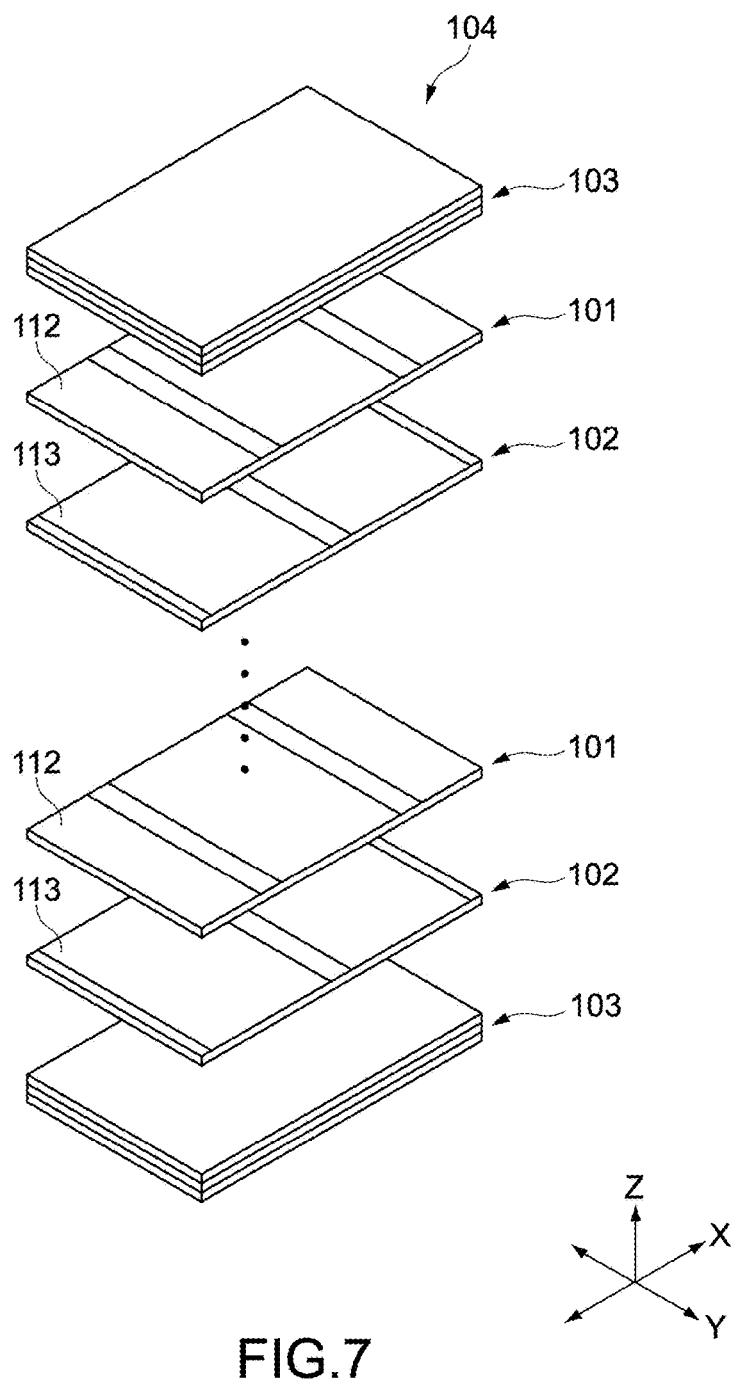
FIG. 7 is an exploded perspective view showing the production process of the multi-layer ceramic capacitor.

FIG. 7 is an exploded perspective view of the multi-layer sheet 104 obtained in Step S02. For the purpose of description, FIG. 7 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction. It should be noted that in the example shown in FIG. 7, three third ceramic sheets 103 are laminated on each of the uppermost and lowermost surfaces of the laminated first and second ceramic sheets 101 and 102, but the number of third ceramic sheets 103 can be changed as appropriate.

2.3 Step S03: Cutting

In Step S03, the multi-layer sheet 104 obtained in Step S02 is cut with a rotary blade, a push-cutting blade, or the like, to produce unsintered multi-layer chips 116.

Figure 8:
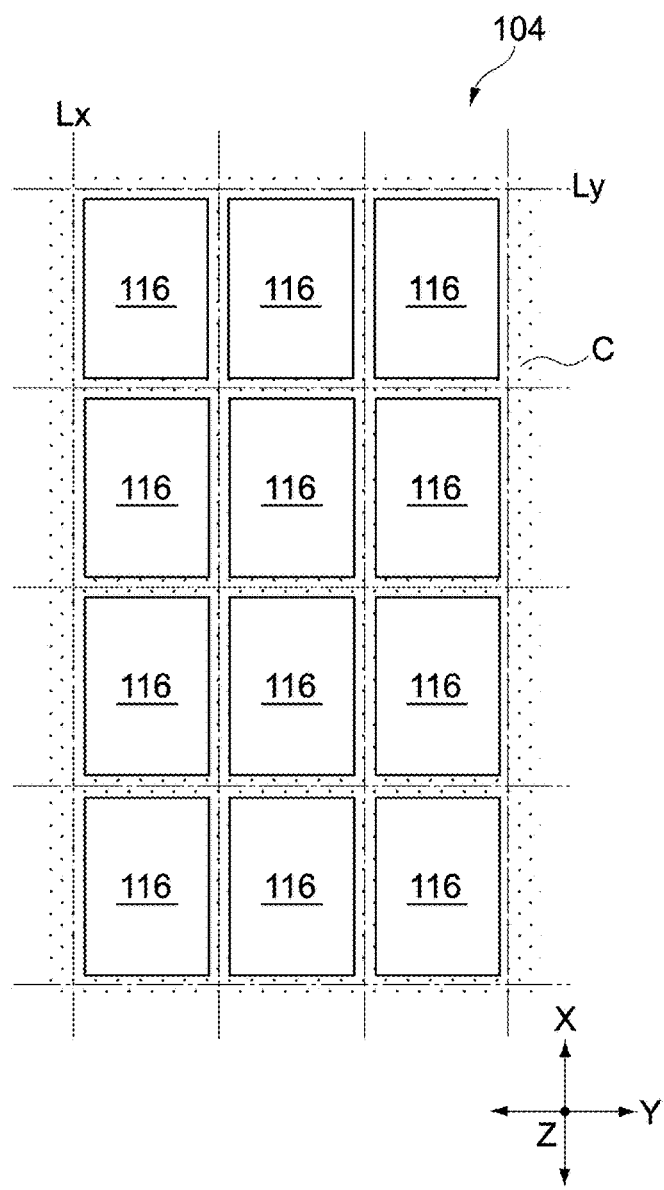
FIG. 8 is a plan view showing the production process of the multi-layer ceramic capacitor.

FIG. 8 is a plan view of the multi-layer sheet 104 after Step S03. The multi-layer sheet 104 is cut along the cutting lines Lx and Ly while being fixed to a holding member C. As a result, the multi-layer sheet 104 is singulated, so that the multi-layer chips 116 are obtained. At that time, the holding member C is not cut, and thus the multi-layer chips 116 are connected via the holding member C.

Figure 9:
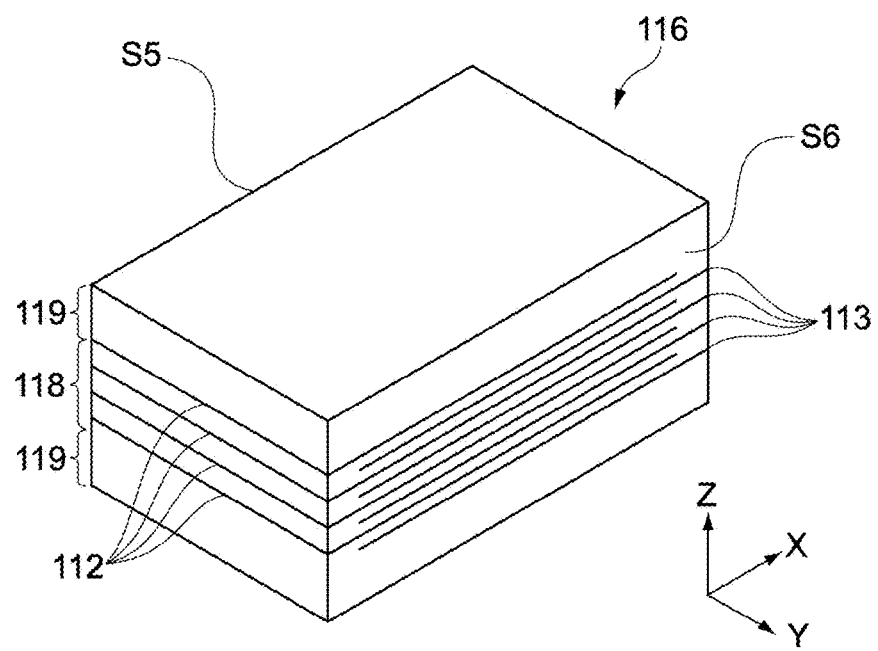
FIG. 9 is a perspective view showing the production process of the multi-layer ceramic capacitor.

FIG. 9 is a perspective view of the multi-layer chip 116 obtained in Step S03. The multi-layer chip 116 includes a capacitance forming unit 118 and covers 119 that are unsintered. In the multi-layer chip 116, the unsintered first and second internal electrodes 112 and 113 are exposed to the cut surfaces, i.e., both side surfaces S5 and S6 oriented in the Y-axis direction.

2.4 Step S04: Formation of Side Margins

In Step S04, unsintered side margins 117 are provided to the side surfaces S5 and S6 of the multi-layer chip 116, to produce an unsintered body 111.

In Step S04, in order to provide the side margins 117 to both the side surfaces S5 and S6 of the multi-layer chip 116, the orientation of the multi-layer chip 116 is changed as appropriate by replacement of a holding member such as a tape, for example.

In particular, in Step S04, the side margins 117 are provided to both the side surfaces S5 and S6 that are oriented in the Y-axis direction, both the side surfaces S5 and S6 being the cut surfaces of the multi-layer chip 116 in Step S03. For that reason, in Step S04, it is desirable to previously detach the multi-layer chips 116 from the holding member C and rotate the multi-layer chips 116 by 90 degrees.

Figure 10:
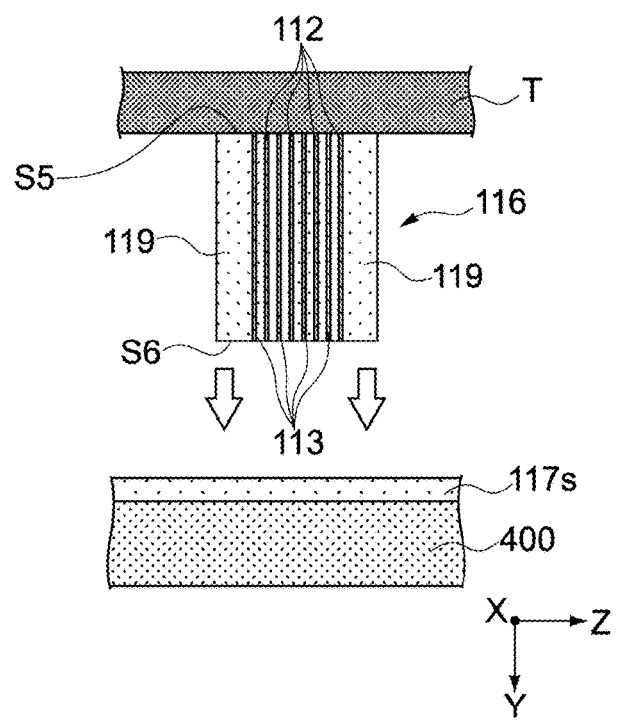
FIG. 10 is a schematic view showing the production process of the multi-layer ceramic capacitor.
Figure 11:
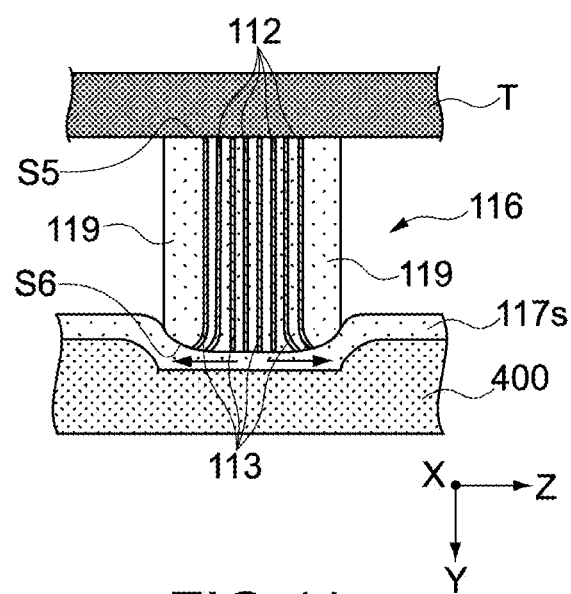
FIG. 11 is a schematic view showing the production process of the multi-layer ceramic capacitor.
Figure 12:
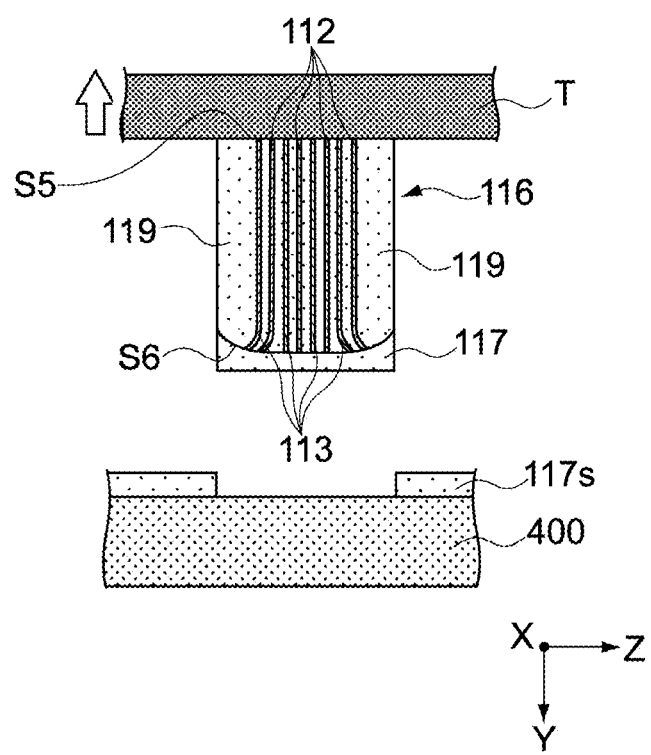
FIG. 12 is a schematic view showing the production process of the multi-layer ceramic capacitor.

FIGS. 10 to 12 are schematic views showing the process of Step S04 and showing a state where a side margin sheet 117s is punched out by the multi-layer chip 116. Hereinafter, the process of Step S04 will be described step by step.

First, the side margin sheet 117s for forming the side margins 117 is prepared. The side margin sheet 117s is configured as an unsintered dielectric green sheet mainly made of insulating ceramics, similar to the first, second, and third ceramic sheets 101, 102, and 103 prepared in Step S01.

The side margin sheet 117s is formed into a sheet by using, for example, a roll coater or a doctor blade.

Next, as shown in FIG. 10, the side margin sheet 117s is disposed above a flat plate-like elastic body 400. The multi-layer chip 116 is then disposed such that the side surface S6 of the multi-layer chip 116 faces the side margin sheet 117s in the Y-axis direction. In Step S04, the orientation of the multi-layer chip 116 is changed as appropriate by the step of replacing the holding member such as a tape, and thus the side surface S5 of the multi-layer chip 116 is held by a tape T, as shown in FIG. 10.

Subsequently, the multi-layer chip 116 is moved toward the side margin sheet 117s in the Y-axis direction, and the side surface S6 of the multi-layer chip 116 is thus pressed against the side margin sheet 117s.

In this case, as shown in FIG. 11, the multi-layer chip 116 bites into the elastic body 400 together with the side margin sheet 117s. Accordingly, the elastic body 400 is raised in the Y-axis direction and pushes up the side margin sheet 117s by a pressing force in the Y-axis direction that is applied from the multi-layer chip 116 to the elastic body 400.

This causes a shear force applied from the elastic body 400 to the side margin sheet 117s, and the side margin sheet 117s facing the side surface S6 in the Y-axis direction is cut off. This side margin sheet 117s is then attached to the side surface S6.

Here, in Step S04, when the side margin sheet 117s is cut off, the side margin sheet 117s is extended in the Z-axis direction. In this case, the elastic body 400 is heated so as to be held at a temperature equal to or higher than a glass-transition temperature of a binder included in the ceramic layers forming the multi-layer chip 116, desirably at a temperature higher than the glass-transition temperature by 20° C. or more.

With this configuration, stress in the Z-axis direction, which is generated when the side margin sheet 117s facing the side surface S6 in the Y-axis direction is extended in the Z-axis direction, is released in a concentrated manner in the vicinity of the covers 119. Thus, the ends of the first and second internal electrodes 112 and 113 in the Y-axis direction in the vicinity of the covers 119 are curved toward the covers 119.

In this case, as a method of controlling the curve amount of the ends of the first and second internal electrodes 112 and 113 in the Y-axis direction in the vicinity of the covers 119, the following control may be performed: when the side surface S6 of the multi-layer chip 116 is pressed against the side margin sheet 117s, a pressurized force applied to the ends of the first and second internal electrodes 112 and 113 in the Y-axis direction in the vicinity of the covers 119 is non-linearly changed.

Specifically, the following control may be performed: the side surface S6 of the multi-layer chip 116 is pressed against the side margin sheet 117s, and a pressure applied to the ends of the first and second internal electrodes 112 and 113 in the Y-axis direction in the vicinity of the covers 119 is increased at once immediately before the multi-layer chip 116 is pulled up in the Y-axis direction.

Examples of such control include a method of pressing the side surface S6 of the multi-layer chip 116 against the side margin sheet 117s, and increasing a pushing speed at which the side surface S6 pushes the side margin sheet 117s immediately before the multi-layer chip 116 is pulled up in the Y-axis direction.

Next, when the multi-layer chip 116 is moved in the Y-axis direction so as to be separated from the elastic body 400, as shown in FIG. 12, only the side margin sheet 117s attached to the side surface S6 is separated from the elastic body 400. Thus, the side margin 117 is formed on the side surface S6 of the multi-layer chip 116.

Subsequently, the multi-layer chip 116 held by the tape T is held by another tape. Thus, the side surface S5 of the multi-layer chip 116 is exposed to face the side margin sheet 117s in the Y-axis direction. Through a step similar to the above-mentioned step of forming the side margin 117 on the side surface S6, the side margin 117 is formed also on the side surface S5. The ends of the first and second internal electrodes 112 and 113 in the Y-axis direction in the vicinity of the covers 119 on the side surface S5 side are also curved toward the covers 119.

This provides an unsintered body 111 including the side margins 117 formed on both the side surfaces S5 and S6 of the multi-layer chip 116.

Figure 13:
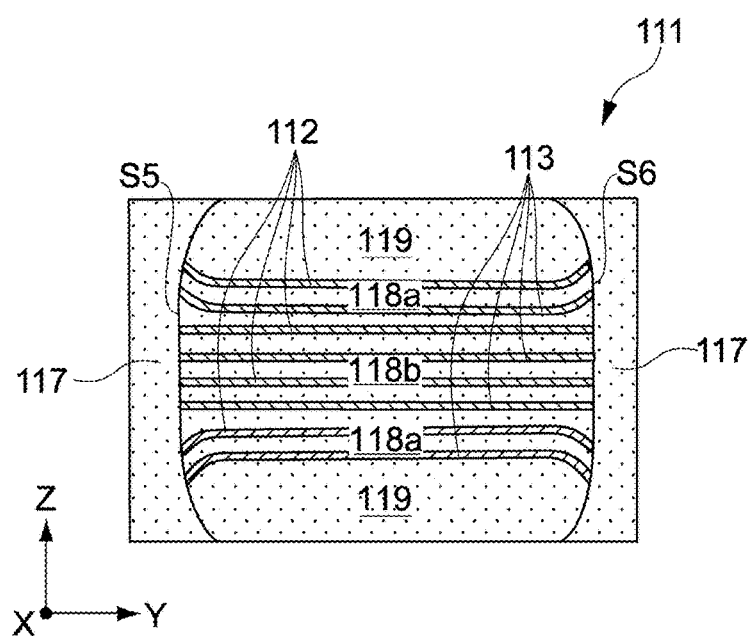
FIG. 13 is a cross-sectional view showing the production process of the multi-layer ceramic capacitor.

FIG. 13 is a cross-sectional view of the unsintered body 111 obtained in Step S04.

In the unsintered body 111, the ends of the first and second internal electrodes 112 and 113 in the Y-axis direction, which are exposed to the side surfaces S5 and S6, are covered with the side margins 117, and the ends of the first and second internal electrodes 112 and 113 in the X-axis direction are exposed to end surfaces in the X-axis direction.

Further, in Step S04, the side margins 117 are formed on the side surfaces S5 and S6 of the body 111. Thus, as shown in FIG. 13, surface layer portions 118a and a center portion 118b are formed in the capacitance forming unit 118. The surface layer portions 118a are adjacent to the covers 119. In each surface layer portion 118a, the ends of the first and second internal electrodes 112 and 113 in the Y-axis direction are curved toward the cover 119. The center portion 118b is adjacent to the surface layer portions 118a in the Z-axis direction.

2.5 Step S05: Sintering

In Step S05, the unsintered body 111 obtained in Step S04 is sintered to produce the body 11 of the multi-layer ceramic capacitor 10 shown in FIGS. 1 to 3. In other words, in Step S05, the first internal electrodes 112 and the second internal electrodes 113 respectively become the first internal electrodes 12 and the second internal electrodes 13, the multi-layer chip 116 becomes the multi-layer unit 16, and the side margins 117 become the side margins 17. Further, the surface layer portions 118a become the surface layer portions 18a, and the center portion 118b becomes the center portion 18b.

A sintering temperature for the body 111 in Step S05 can be determined on the basis of a sintering temperature for the multi-layer chip 116 and the side margins 117. For example, when a barium titanate ($BaTiO_3$) based material is used as ceramics, the sintering temperature for the body 111 can be set to approximately 1,000 to 1,300° C. Further, sintering can be performed in a reduction atmosphere or a low-oxygen partial pressure atmosphere, for example.

Here, in this embodiment, since the ends of the first and second internal electrodes 112 and 113 in the Y-axis direction in the vicinity of the covers 119 are curved toward the covers 119 through Step S04 described above, intervals between the ends of the first internal electrodes 112 in the Y-axis direction and the ends of the second internal electrodes 113 in the Y-axis direction are favorably ensured in the vicinity of the corners of the capacitance forming unit 18.

With this configuration, at the time of sintering of the body 111, even when the ends of the first and second internal electrodes 112 and 113 in the Y-axis direction in the vicinity of the corners of the capacitance forming unit 18 are deformed toward the center portion 118b due to, for example, differences in shrinkage behavior at the time of sintering between the side margins 117, the capacitance forming unit 118, and the covers 119, intervals between the ends of the first and second internal electrodes 112 and 113 in the Y-axis direction are ensured. Thus, contact of the ends of the first and second internal electrodes 112 and 113 in the Y-axis direction is suppressed.

2.6 Step S06: Formation of External Electrodes

In Step S06, the first external electrode 14 and the second external electrode 15 are formed on the body 11 obtained in Step S05, to produce the multi-layer ceramic capacitor 10 shown in FIGS. 1 to 3.

In Step S06, first, an unsintered electrode material is applied so as to cover one of the end surfaces of the body 11 and then applied so as to cover the other one of the end surfaces of the body 11, the end surfaces being oriented in the X-axis direction. The applied unsintered electrode materials are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the processing in Step S06 described above may be performed before Step S05. For example, before Step S05, the unsintered electrode material may be applied to both the end surfaces of the unsintered body 111 that are oriented in the X-axis direction, and in Step S05, the unsintered body 111 may be sintered and, simultaneously, the unsintered electrode material may be baked to form base films of the first external electrode 14 and the second external electrode 15.

2.7 Modified Example

The method of producing the multi-layer ceramic capacitor 10 is not limited to the production method described above, and the production steps may be changed or added as appropriate.

For example, in the production method described above, the side margins 117 are formed on the side surfaces S5 and S6 of the multi-layer chip 116, and thus the surface layer portions 118a are formed in the capacitance forming unit 118. However, a method of forming the surface layer portions 118a in the capacitance forming unit 118 is not limited to the method described above.

Figure 14:
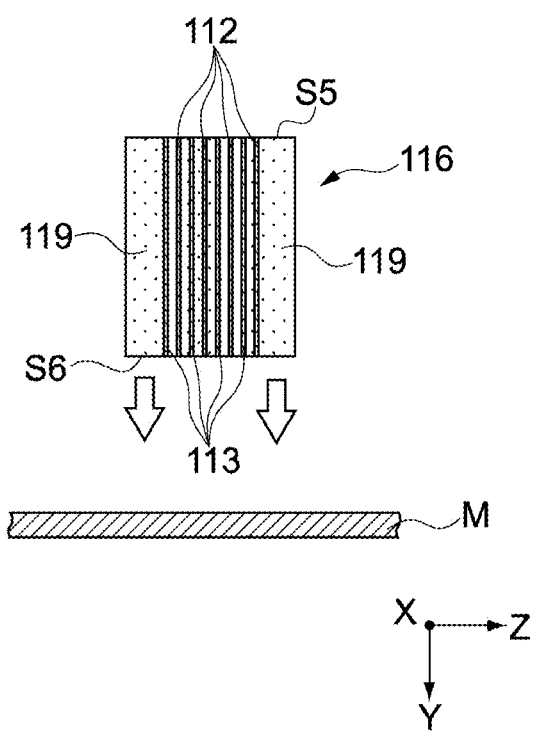
FIG. 14 is a schematic view showing a production process of a multi-layer ceramic capacitor according to a modified example of the present invention.
Figure 15:
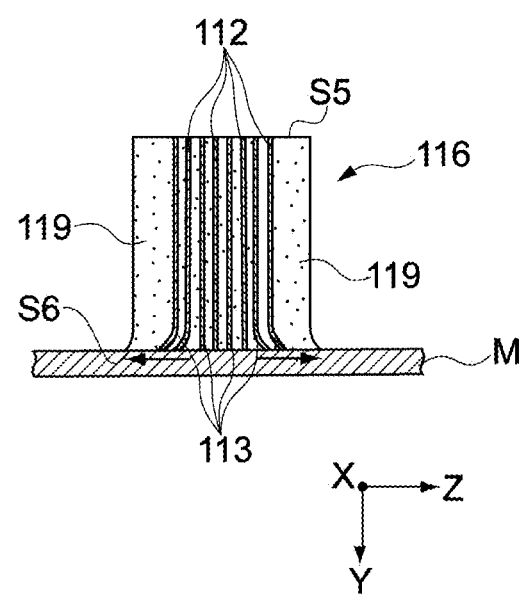
FIG. 15 is a schematic view showing the production process of the multi-layer ceramic capacitor.

In this embodiment, before the side margins 117 are formed on the side surfaces S5 and S6 of the multi-layer chip 116, the surface layer portions 118a may be formed in the capacitance forming unit 118 by pressing the side surfaces S5 and S6 of the multi-layer chip 116. FIGS. 14 and 15 are schematic views each showing a production process of the multi-layer ceramic capacitor according to a modified example of the present invention. Hereinafter, a method of forming the surface layer portions 118a according to a modified example of the present invention will be described with reference to FIGS. 14 and 15.

First, as shown in FIG. 14, the multi-layer chip 116 is disposed such that the side surface S6 of the multi-layer chip 116 and a metal plate M face each other in Y-axis direction. The metal plate M is heated so as to be held at a temperature equal to or higher than a glass-transition temperature of a binder included in the ceramic layers forming the multilayer chip 116, desirably at a temperature higher than the glass-transition temperature by 20° C. or more.

Subsequently, the multi-layer chip 116 is moved in the Y-axis direction toward the metal plate M, and the side surface S6 of the multi-layer chip 116 is pressed against the metal plate M. In this case, the vicinity of the side surface S6 of the multi-layer chip 116 softens. As a result, the vicinity of the covers 119, which is not restrained in the Z-axis direction, is deformed so as to be spread in the Z-axis direction, and the ends of the first and second internal electrodes 112 and 113 in the Y-axis direction in the vicinity of the covers 119 are also deformed toward the covers 119.

Next, by a step similar to the above-mentioned step of pressing the side surface S6 against the metal plate M, the ends of the first and second internal electrodes 112 and 113 in the Y-axis direction in the vicinity of the covers 119 on the side surface S5 side are also curved toward the covers 119. With this configuration, the surface layer portions 118a are formed in the capacitance forming unit 118.

Further, this embodiment is not limited to a case where the side margins 117 are formed posteriori on the side surfaces S5 and S6 of the multi-layer chip 116. The surface layer portions 118a can also be formed in the capacitance forming unit 118 by a method different from the method described above.

Examples of such a method include a method of adjusting the thicknesses of the first ceramic sheets 101 and the second ceramic sheets 102. For example, when the unsintered body 111 is produced, the thicknesses of the first ceramic sheets 101 and the second ceramic sheets 102 are adjusted such that the thicknesses of the ceramic layers including five to ten layers in the vicinity of each cover 119 are gradually increased from the center portion of the body 111 in the Y-axis direction toward both the side surfaces thereof in the Y-axis direction.

3. Other Embodiments

While the embodiment of the present invention has been described, the present invention is not limited to the embodiment described above, and it should be appreciated that the present invention may be variously modified.

For example, in the multi-layer ceramic capacitor 10, the capacitance forming unit 18 may be divided into capacitance forming units in the Z-axis direction. In this case, in each capacitance forming unit 18, the first internal electrodes 12 and the second internal electrodes 13 only need to be alternately disposed along the Z-axis direction. In a portion where the capacitance forming units 18 are next to each other, the first internal electrodes 12 or the second internal electrodes 13 may be continuously disposed.

What is claimed is:

1. A multi-layer ceramic capacitor, comprising:
 a body including:
  a main surface oriented in a first direction and being a flat surface;
  a capacitance forming unit that includes ceramic layers laminated in the first direction and internal electrodes disposed between the ceramic layers;
  a cover that covers the capacitance forming unit from the first direction; and a side margin that covers the capacitance forming unit from a second direction orthogonal to the first direction, the capacitance forming unit including a surface layer portion adjacent to the cover, ends of the internal electrodes in the second direction in the surface layer portion being curved toward the cover, and in an internal electrode adjacent to the cover, a distance in the first direction between the main surface and the end of the internal electrode being shorter than a distance in the first direction between the main surface and the center portion of the internal electrode in the second direction.

2. The multi-layer ceramic capacitor according to claim 1, wherein a dimension of a portion of the surface layer portion in the first direction is 5 μm or more, the ends of the internal electrodes being disposed in the portion.

* * * * *